United States Patent [19]

Deban

[11] 4,286,284
[45] Aug. 25, 1981

[54] COLOR TELEVISION SIGNAL DECODING DEVICE

[75] Inventor: Gilles Deban, Viroflay, France

[73] Assignee: Sonotec S.A. - Societe Nouvelle de Produits et Techniques, Paris, France

[21] Appl. No.: 84,696

[22] Filed: Oct. 15, 1979

[30] Foreign Application Priority Data

Oct. 13, 1978 [FR] France ............................... 78 29214

[51] Int. Cl.³ .............................................. H04N 9/42
[52] U.S. Cl. ..................................................... 358/11
[58] Field of Search .......................................... 358/11

[56] References Cited
U.S. PATENT DOCUMENTS 4,106,053  8/1978  Maxemchuk ........................... 358/11

*Primary Examiner*—Richard Murray
*Attorney, Agent, or Firm*—Sughrue, Rothwell, Mion, Zinn and Macpeak

[57] ABSTRACT

Color decoding device for signals emitted by an NTSC source for the purpose of coding in any system, characterized by the use of a shifter operating at a reference frequency receiving signals in series and transmitting 4 parallel bits to a carrier which samples them at a frequency equal to one fourth of the reference frequency. The signals and their complements produced by the sampler are transmitted to a display device through a matrix of interchangeable resistors. The invention applies to all coding systems, especially SECAM, and in particular to the SECAM display of signals emitted by NTSC computers.

6 Claims, 3 Drawing Figures

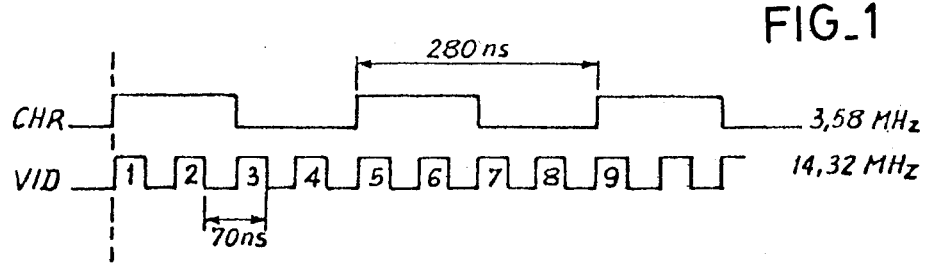
FIG_1
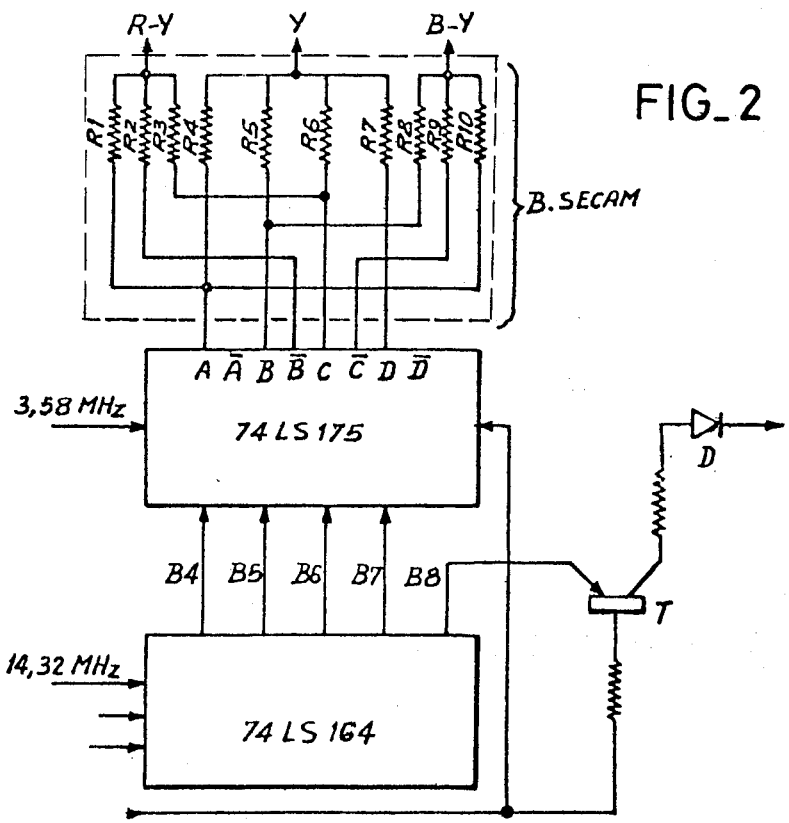
FIG_2
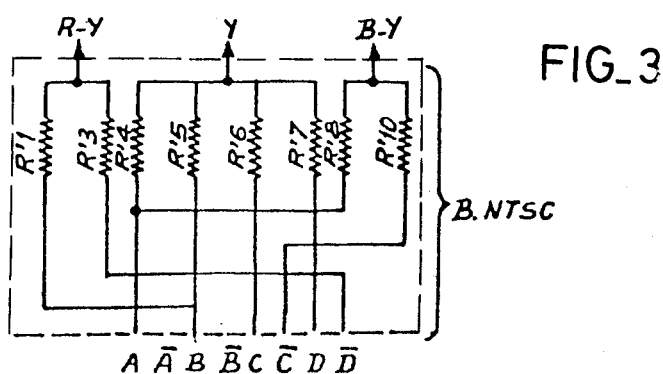
FIG_3

COLOR TELEVISION SIGNAL DECODING DEVICE

This invention concerns a color decoding device or signal converter which makes it possible to use a source of signals coded in conformity with the NTSC system, as used in the United States, to obtain signals that can be sent to display instruments operating according to different coding systems: for instance, SECAM, PAL or even NTSC or still in R.V.B. (red, green and blue) as data which can be used directly by hooking into a special outlet.

To be more precise, the notion of compatibility amongst different elements in a facility operating according to varying standards is becoming increasingly frequent, and especially with respect to control, measurement, computation, memory, data processing instruments in the NTSC group, of which the display must be implemented on a cathode ray tube with a different color coding. In order to establish the concepts in what follows, reference will be made for the sake of illustration to an NTSC computer and a SECAM display.

One of the goals behind this invention is therefore to decode color data coded in NTSC for future use in a potentially different system.

Another goal of this invention is, should one desire, to alter the spectrum of programmable colors through a simple modification of circuit elements.

According to the NTSC system, color coding is based on a phase relationship with the chrominance reference signal at 3.58 MHz which corresponds to a period of 280 nanoseconds. The video signal is sampled at 14.32 MHz such that the basic datum corresponds to a period of 70 nanoseconds. Therefore we have 4 color data elements per reference period of 280 nanoseconds, which corresponds to $2^4=16$ possible states, or 16 different colors.

FIG. 1 illustrates schematically a CHR chrominance signal and a VID video signal. For purposes of simplification, all the signals have constant amplitudes.

According to this invention, decoding is carried out by implementing a series displacement at 14.32 MHz and a parallel sampling of 4 bits at 3.58 MHz. The quality level of the decoding can be a problem, however, because if one uses a series displacement, the 1st bit (1, FIG. 1) is shifted an additional 70 nanoseconds during its propagation through the circuit. A delay thus exists in relation to the reference signal, which can become annoying. According to this invention, this inconvenience is avoided by shifting the sampling by one reference period, which does not affect the video level since the corresponding signal is entirely recreated. This provides the advantage of implementing an accurate decoding without fault wherein propagation delays do not intervene. Therefore, according to this invention, one enters the series video signal which is decoded at 14.32 MHz, and bits 4 to 7 (FIG. 1) are sampled in parallel at a frequency of 3.58 MHz. As will be seen later, a quadruple latch is used for this, which outputs four binary digits or data signals and their complements.

Adequate matrixing of these signals and their complements produces the luminance signals Y and the chrominance signals R-Y and B-Y. Matrixing is achieved with resistors which, according to a peculiar aspect of this invention, are mounted on a removable card, thus enabling an alteration of the spectrum of programmable colors.

Furthermore, the device makes it possible to adjust any coding form at the output, especially in regard to display.

As we will see later, this invention also enables the processing of a document which in some data sources is not "white" but rather is made up discreetly of complementary color signals.

In order to better understand the technical features and advantages of this invention, an illustrative but non-limiting example will be described.

Referring to FIG. 1 described earlier, and to FIGS. 2 and 3 which show diagrams of color signal decoding and document production circuits, FIG. 2 shows a resistor matrix for SECAM coding, and FIG. 3 shows such a matrix for NTSC coding.

In these figures and for the purpose of simplification, the sources of the signals to be processed and the display circuits therefor are not shown. In FIG. 2, the decoding circuit essentially comprises two known or "shelf" integrated circuits designated as types 74 LS 164 and 74 LS 175.

The first circuit, known as a shifting circuit, receives the video signals at the data input, the SYNC synchronizing signal at the clear or reset input, and the reference signal at 14.32 MHz. At the output, bits 4 to 7 (FIG. 1) are shown on the B4, B5, B6, B7 lines; they are applied to the quadruple latch 74 LS 175 supplied with a 3.58 MHz signal, which emits $\overline{A}, \overline{B}, \overline{C}, \overline{D}$ signals and their respective complements A, B, C, D. The operation of this circuitry is as described above: basically, a series displacement at 14.32 MHz takes place inside the shifting circuit, which is followed by a second parallel sampling phase of 4 bits (B4 to B7) at a frequency of 3.58 MHz in the quadruple latch.

The B.SECAM matrix (FIG. 2) is made up of a group of resistors (R1 to R10) from the outputs of which are obtained the Y luminance signal and the R-Y and B-Y chrominance signals. The matrixing or signal combining is achieved by these resistors having the ratios/values shown in Table 1. In this table we have shown values for various resistors, for the sake of illustration, which in practice offer the benefit of having produced particularly satisfactory results.

With respect to the processing of a document, or text, as mentioned earlier some sources emit signals which correspond discreetly to two complementary colors: for example green and purple. Referring to FIG. 2, one employs the document or TEXTE signal to achieve a video short-circuit with the group organized around the transistor T and the diode D between the 8th bit B8 from the shifting circuit and the input of the luminance mixing circuit for the display. This is achieved with the emitter collector circuit of the transistor, which receives the document signals at its base. A displacement or uncoupling is obtained, through the diode, which injects the document video. What ensues is luminance saturation. The clearing of the latch sampling circuit implements the disengaging of any chrominance by clearing the corresponding signals.

TABLE 1

| CODING MATRIX | SIGNALS | RESISTORS MARKS | VALUES | LATCH OUTPUT |
|---|---|---|---|---|
| SECAM | Luminance Y | R4 | 1 | A |
|  |  | R5 | 2.2 | B |

TABLE 1-continued

| CODING MATRIX | SIGNALS | RESISTORS MARKS | RESISTORS VALUES | LATCH OUTPUT |
|---|---|---|---|---|
| | | R6 | 4.7 | C |
| | | R7 | 10 | D |
| | Chrominance R-Y | R1 | 4.7 | A |
| | | R2 | 2.2 | $\bar{B}$ |
| | | R3 | 10 | C |
| | B-Y | R8 | 10 | B |
| | | R9 | 2.2 | $\bar{C}$ |
| | | R10 | 4.7 | D |
| NTSC | Luminance Y | R'4 | 2.2 | A |
| | | R'5 | 2.2 | B |
| | | R'6 | 2.2 | C |
| | | R'7 | 2.2 | D |
| | Chrominance R-Y | R'1 | 2.2 | B |
| | | R'3 | 2.2 | $\bar{D}$ |
| | B-Y | R'8 | 2.2 | A |
| | | R'10 | 2.2 | $\bar{C}$ |

I claim:

1. A color decoding device for signals from an NTSC coding source with respect to their coding in any system, characterized by: a shifting circuit for receiving series video signals, displacing them at a reference frequency, and transmitting four bits in parallel, a latch circuit for receiving said four parallel bits, sampling them at a frequency equal to one fourth of the reference frequency, and producing four signals and their complements, and a matrix of resistors for receiving selected ones of said four signals and their complements and for transforming them into luminance and chrominance signals for transmittal to a display device.

2. A device according to claim 1 wherein the matrix of resistors is mounted on a removable card, each such card corresponding to a specific coding.

3. A device according to claim 2 wherein the card corresponds to a particular spectrum of colors.

4. A device according to claim 1 wherein the bits coming from the shifting circuit and sampled in parallel in the latch circuit are the fourth to seventh bits counted from the bit corresponding to the first reference period in the shifting circuit.

5. A device according to claim 1 wherein the complementary document color signals are fed to a zero-setting input of the latch circuit, and to a group of video short circuits between the output of the eighth bit of the shifting circuit and the input of the luminance mixing circuit of the display.

6. A device according to claim 5 wherein the short circuit group is arranged around the emitter collector circuit of a transistor which receives at its base the document signals and which is followed by a diode.

* * * * *